Oct. 27, 1970  G. W. VON HOFE  3,536,550
METHOD OF AND APPARATUS FOR PRINTING AND FEEDING LABELS IN A
CONTINUOUS WEB, AND FOR VERIFYING AND CUTTING INDIVIDUAL
LABELS THEREFROM FOR APPLICATION TO ARTICLES
Filed Jan. 28, 1966  7 Sheets-Sheet 1

INVENTOR
GEORGE W. VON HOFE

BY  *John J. Hart*

ATTORNEY

FIG. 3

INVENTOR
GEORGE W. VON HOFE

INVENTOR
GEORGE W. VON HOFE
BY
ATTORNEY

United States Patent Office 3,536,550
Patented Oct. 27, 1970

3,536,550
METHOD OF AND APPARATUS FOR PRINTING AND FEEDING LABELS IN A CONTINUOUS WEB, AND FOR VERIFYING AND CUTTING INDIVIDUAL LABELS THEREFROM FOR APPLICATION TO ARTICLES
George W. von Hofe, Millington, N.J., assignor to New Jersey Machine Corporation, Hoboken, N.J., a corporation of New Jersey
Filed Jan. 28, 1966, Ser. No. 523,756
Int. Cl. B65c *3/16, 9/44, 9/46*
U.S. Cl. 156—64                                                              32 Claims

ABSTRACT OF THE DISCLOSURE

A labeling machine including means for feeding a continuous web having thereon a series of labels of a given length but with certain of the adjacent labels thereon spaced differently than other adjacent labels, and having thereon control elements related to such differences in the label spacing, the machine further including label severing means operable to cut off the terminal labels in the web at their given lengths regardless of the different spacings therebetween, and means controlled by the control elements on the web and operating the severing means to cut from the web the labels in uniform length and without having attached thereto any web portions providing spacings between adjacent labels.

---

This invention relates to labels for articles such as bottles, containers, tubes, etc., and is particularly concerned with the manufacture of a continuous web of labels provided with register means for control purposes, the detection of such register means in the feed of the continuous web for purposes of label verification and registration, and the control thereby of devices such as means for controlling the operation of the machine, for cutting individual labels and removing waste from the web, and for registering the web with respect to certain mechanisms.

Labels in a continuous web, often referred to as roll labels, are usually successively printed on the web as the latter is intermittently fed past a printing device. Finely detailed labels such as are used in the drug trade are usually printed by the well known letter press process which, while it has certain advantages, is not entirely satisfactory because of many disadvantages that are inherent in the means for practicing it. Thus, the plates used in this process are expensive, its practice requires the employment of experienced printers, and it is difficult to adapt this process to the label field and produce quality results. Furthermore, the letter press process is a relatively slow and expensive method of label printing. It is recognized by the art that another well known process of printing known as offset printing has many advantages over the letter press process for producing finely detailed labels, but up until now there has been no economically known way of utilizing this superior process to produce labels in roll form. This is principally due to its inflexibleness in cut off length resulting from the gap between the ends of the plate or blanket and the fact that the cylinders are all of the same fixed size because of the design of the press.

Another factor which has proved troublesome to the art in connection with continuous webs of labels, is concerned with the register means that have heretofore been employed for control purposes. These prior register means usually take the form of holes punched in the web, or visible marks printed on the web and in either case it is necessary to provide such register means in a particular location on each label in order that such register means may be removed from the label after it has performed its intended function, or if left on will interfere as little as possible with the printed and design features of the label. However, if such register means is not removed from the label, which requires an additional operation in the label's preparation, it will always detract to some extent from the appearance of the label.

One of the objects of the invention therefore is to provide a method enabling the printing of labels on a continuous web by offset printing.

A further object of the invention is to provide a novel method of printing, whereby a series of labels of given size may be repeatedly printed on lengths of web of a given dimension greater than the combined lengths of the labels in each series thereof contained on each such web length.

Another object of the invention is to provide an improved method by which labels may be printed on a continuous web with the use of photographically made printing plates.

A further object of the invention is to provide an improved method of applying to labels registry means which will not affect the appearance of the labels even though it is not removed therefrom.

A further object of the invention is to provide an improved method whereby registry means may be applied to labels in any location thereon according to the label's coding requirements.

Another object of the invention is to provide novel methods of optical-electrical and magnetic-electrical control of the feeding, formation and verification of labels.

A still further object of the invention is to provide a novel control means capable of being activated by registry means on the labels which are invisible to the human eye.

A still further object of the invention is to provide a coded control and/or means responsive to properly coded invisible registry means on the labels to actuate operable means controlled whereby, but non-responsive, or actuatable automatically to render the system inoperative, whenever an improperly coded label is scanned thereby.

A further object of the invention is to provide a cutting means controlled by registry means on the web and capable under such control of cutting labels non-uniformly spaced on a continuous web.

Another object of the invention is to provide a cutting means capable of removing web material between labels in accordance with a predetermined sequence.

Another object of the invention is to provide a cutting means controlled by registry means on the web and operable under such control to selectively cut labels, or labels and excess web material from a continuous web provided with joined and spaced labels thereon.

A further object of the invention is to provide a system capable of printing labels of different sizes on a continuous web and of cutting from the web the different sized labels.

A still further object of the invention is to provide a novel system for applying a code or control number to labels at the time of the printing of such labels and for checking the presence or the lack of a particular control number on a label that is being applied to a particular product.

A still further object of the invention is to provide a novel system for applying verifying symbols or codes to sequences of labels provided on printing plates and checking on the printed label webs the particular verifying symbols contained in the sequences of labels to be applied to particular products.

Other objects of the invention, as well as the advantages and novel features thereof will appear from a perusal of the following description when read in connection with the accompanying drawings, in which.

Figure 1:
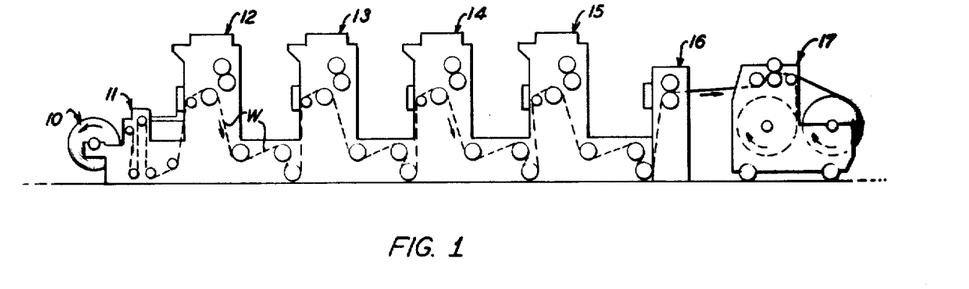
FIG. 1 is a schematic layout of a rotary web offset printing press for printing roll labels in accordance with the invention.

The invention may be practiced as a continuous operation, but it is most advantageously practiced as a two step operation in which the webs of labels embodying the invention are first made in a rotary web offset printing press embodying the invention, and are then utilized in a labeling machine embodying the features of the invention. FIG. 1 of the drawings shows a schematic layout of a suitable offset printing press that may be utilized for printing rolls of webs provided with labels suitable for use on containers for ethical drugs. The several units constituting the press are of known construction and include an unwind station 10 at which a roll of continuous paper web W of a width sufficient to permit the printing thereon of multiple rows of labels, is rotatably supported. The web from the supply roll initially passes through a tension control unit 11 and then may pass through a plurality of printing units 12, 13 and 14 for successively printing on the web in superposed relation the required number of images necessary to form the complete labels. The printed web then may pass through a coating unit 15 for applying a protective coating to the labels. From the coating unit 15, the web may pass through a rotary punching unit, the purpose of which shall be hereinafter more fully explained, and then through a slitting and rewind unit for slitting the web lengthwise into a plurality of label strips and rewinding the slit strips into label rolls in a manner well known to the art.

Figure 2:
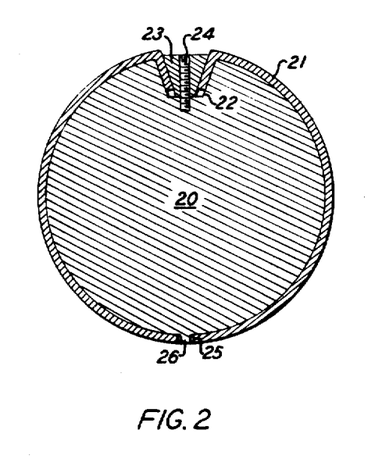
FIG. 2 is a diagrammatic vertical sectional view of a printing roll in an offset press.

Each of the printing units 12, 13 and 14 in an offset web press of the type depicted in FIG. 1 of the drawings, is composed of a printing cylinder 20 in FIG. 2, on the exterior surface of which is mounted the printing plate 21. The ends of the plate 21 are bent down into a longitudinal groove 22 provided in the cylinder and may be fastened to the cylinder by a wedge-shaped member 23 tightened in wedged relation in the groove 22 by a plurality of set screws 24 to secure the printing plate 21 to the cylinder. Thus, across the mouth of the groove 22 there is a gap approximately ¼ inch wide throughout the length of the cylinder and in the direction of the widths of the labels to be printed on a web, which prevents the application of printed matter to those portions of the web which extend over such gap in the feed of the web.

Figure 3:
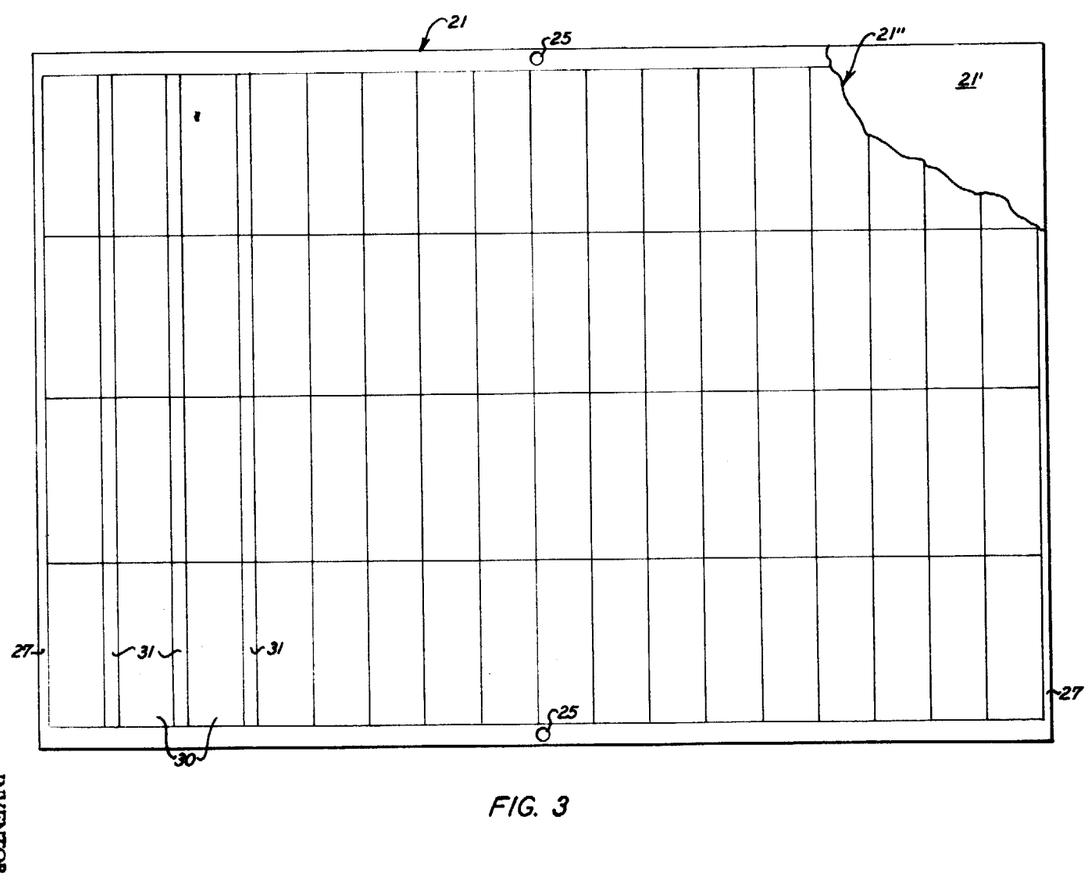
FIG. 3 is a plan view of a printing plate embodying the invention.

The printing plate 21 is preferably a photosensitized plate such as is commonly used in the practice of the offset process. Plates of the preferred type are usually composed of a flexible plate metal backing 21' on which is applied a layer 21" of the photosensitive emulsion. Exposure of the plate may be made by a carbon arc, or any equivalent intensity source. The printing plates 21 are each provided along the sides thereof with two registering holes 25 (FIG. 3) which register with pins 26 in FIG. 2 provided on the printing cylinder 20 to enable the ready and proper placement of a printing plate on the printing cylinder. Preferably as shown in FIGS. 2 and 3, the pins 26 are located on the printing cylinder 20 diametrically opposite the groove 22 thereof and the registering holes 25 are located at the centers of the two side edges of the plate 21, so that the center of the plate will be held fixed by the pins thereby enabling the plate to be properly wrapped around the cylinder and the two ends thereof properly registered in the groove 22. The importance of this feature will be realized when it is understood that the end margins 27 of the plate which are tucked into the groove 22 for securement by the wedge member 23, are quite narrow in width, for example, of the order of ⅛".

Between the two margins 27 of the plate 21 the sensitized area thereof is provided with the areas 30 of label material for a given product which are to be printed on the continuous paper web W. The label areas 30 are laid out so that the height of the labels extends lengthwise of the plate and will be wrapped around the printing cylinder, and so that a plurality of rows of such label areas are provided across the width of the plate; there being four rows provided in the plate shown in FIG. 3 of the drawings. The length of the plate 21 between the end margins 27 thereof is a given fixed length because offset printing presses are usually constructed for printing cylinders of a given diameter. It has been determined that the heights of labels most commonly employed in the container labeling art range from about six inches maximum height to ¾ inch minimum height and vary in small steps between these two limits. It has been found also that plates 18 inches in length, if constructed in accordance with the invention, may be utilized to print the labels falling within such given range. With a plate 18 inches long, there will be provided a given or predetermined fixed printing repeat length of 17¾ inches because of the two ⅛ inch end margins 27 which must be utilized to secure the plate to the printing cylinder. There will of course be certain sized labels the multiple areas 30 of which will exactly fit within such given fixed repeat length, but the heights of most labels within the stated range will not have a repeat length which is exactly the same as such given fixed repeat length. In accordance with the invention, this problem is overcome by dividing the fixed printing repeat length by the height of the label between the parameters set and which it is desired to print for a given product, to obtain the whole number of label areas 30 which can be printed along the web by one revolution of the plate. There will be a remainder of at least ¼ inch, and this remainder may be utilized as a whole if not more than 1½ inches, or may be divided into equal increments of not less than ¼ inch and not more than 1½ inches. The printing plate 21 is then prepared repeating the label areas 30 as many times as the whole number thereof, and spacing certain of such label areas by the amount of the increment or increments constituting the said remainder. The increment or increments, if a multiplicity thereof, may be arranged in any suitable manner on the plate. For example, as is shown in FIG. 3 of the drawings, such increments 31 which are three in number and ¼ inch in height, are located between the first four label areas 30 on the left hand side of plate 21, as viewed in such figure, and the remaining label areas 30 arranged in abutting relation. The label areas shown are one inch in height so that there are 17 of them provided lengthwise in the plate print length of 17¾ inches. The thus prepared printing plate 21 is then mounted on the printing cylinder 20 in the manner described and the press operated to print the labels on the web W.

It will be understood from the foregoing that a label web produced as aforesaid in accordance with the invention, will have printed thereon certain labels which will be spaced apart by the increments 31 provided on the plate and by the ¼ inch gap at the ends of each given fixed repeat length of the plate 21, and other labels which will be connected together without any intervening spacing web portion. In other words, certain of the successive labels on the web will be spaced apart by given amounts, and other successive labels on the web will abut each other, and this pattern of spaced and abutting labels set on the printing plate will be repeated throughout the length of the web. In order that a label web of this type may be employed in a labeling machine, it is necessary that such machine be provided with means for severing both the abutting labels and the spaced labels on the web and for eliminating the web portions which separate the spaced labels. In accordance with the invention this is accomplished by providing on the web indicia for properly registering the abutting and spaced labels on the web with the cutting mechanism of the labeling machine, and for controlling the operation of such cutting mechanism which is constructed so that it is capable of making single cuts to sever abutting labels and of making double cuts to eliminate the web portions between spaced labels.

Figure 4:
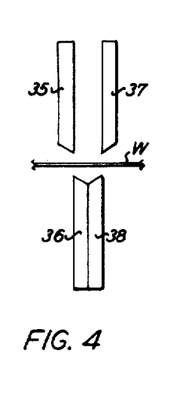
FIG. 4 is a diagrammatic elevation view of the cutting mechanism.
Figure 5:
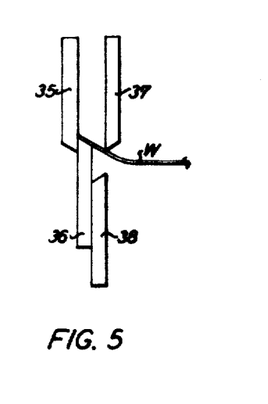
FIG. 5 is a view similar to FIG. 4 and showing the operation of one set of cutting blades.
Figure 6:
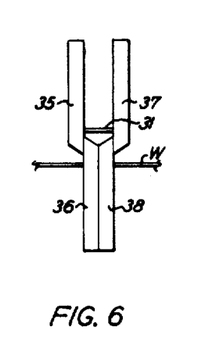
FIG. 6 is a view similar to FIG. 4 and showing both sets of blades cutting the web.
Figure 7:
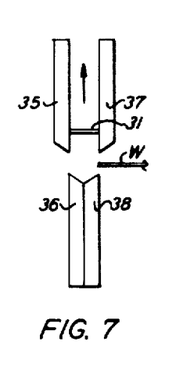
FIG. 7 is a view similar to FIG 6 indicating the manner in which the cut chip is removed.

It is believed advisable for an understanding of the invention to first consider the mechanism for cutting the labels from the web. Considering now FIGS. 4 to 6 of the drawings, it will be noted that the cutting mechanism includes a pair of cooperative blades 35, 36 which reciprocate toward and away from each other along fixed paths to cut the web W in the manner shown in FIG. 5. Not only are the blades 35, 36 fixed against movement along the run or travel of the web W once they have been properly adjusted for the label size to be cut, but their cutting action cannot be interfered with during the normal operation of the machine. Associated with the blades 35, 36 are a second pair of cooperative blades 37, 38 which also reciprocate toward and away from each other to cut the web W. When the labels registered with the cutting mechanism are in abutting relation, the blades 37, 38 are latched in inoperative position and the blades 35, 36 only will operate to sever from the web the leading one of such abutting labels. When, however, a pair of labels joined in spaced relation by an increment 31 is advancing into registry with the cutting mechanism, the blades 37 and 38 are caused to be unlatched so that on the next operation of blades 35, 36, blades 37, 38 will move with them and both sets of blades will simultaneously sever from the web the increment 31 joining the spaced labels as shown in FIG. 6. The cut increment 31 or chip may be removed upwardly between the blades 35, 37 as shown in FIG. 7, by known types of vacuum machines used for this purpose in the art.

Figure 8:
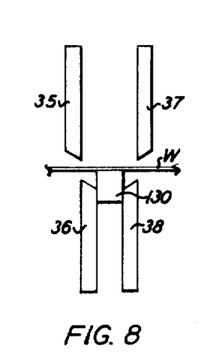
FIG. 8 is a view similar to FIG. 4 but showing the sets of blades adjusted to cut a chip of larger size.

FIGS. 4 to 7 of the drawings show the two sets of blades 35, 36 and 37, 38 set for the removal from the web W of increments 31 of the smallest size, namely ¼ inch. When increments 31 of greater height are to be severed from the web, the set of blades 37, 38 are shifted as a unit away from the set of blades 35, 36 and along the line of travel of the web until they are spaced from the set of blades 35, 36 the desired distance, as shown in FIG. 8 of the drawings. When the two sets of blades are next operated in unison they will cut the larger sized increment or chip 31' shown in FIG. 9. The shifting of the set of blades 37, 38 is preferably accomplished manually by means of a micrometer adjustment which is built into the cutting mechanism and which is constructed to enable the sets of blades to be accurately adjusted to cut any size of increment in the aforesaid range thereof between the minimum of ¼ inch and the maximum of 1½ inches.

The registration of the labels with the set of cutting blades 35, 36 and the operation of the set of cutting blades 37, 38 are controlled by the coaction of control elements provided on the web and a scanning device located along the path of feed of the web at least one repeat length of web (18 inches in the case of the printing plate illustrated in FIG. 3 of the drawings) upstream from the line of cut of the set of cutting blades 35, 36. Thus, there are provided on the web a set of control elements for registering the labels with the cutting blades 35, 36, these being one of such elements for each label and each of such elements being associated with a label. There are also provided on the web separate control elements for controlling the operation of the blades 37, 38 and these control elements are equal in number to the number of increments provided on the web and each is located on the web in advance of or downstream from an increment. It will be understood, that while particular control elements are associated with particular labels and increments on the web, the coaction of such elements in a particular repeat length of web with the scanning means does not control the cutting of the labels and increments in that particular repeat length of web, but controls the cutting of similarly located labels and increments in the repeat length of web in advance of such particular repeat length due to the spacing of the cutting and scanning means.

Figure 10:
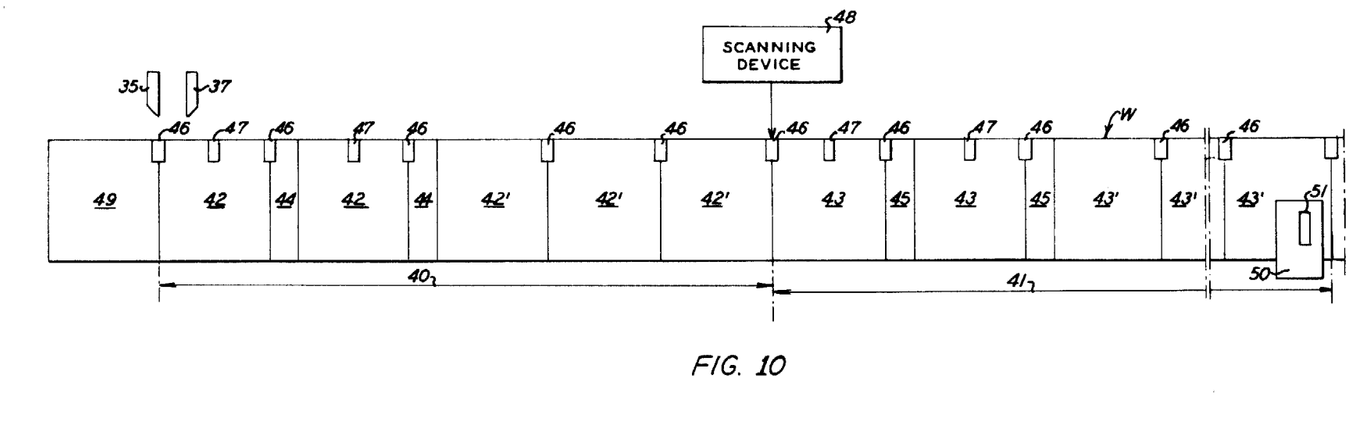
FIG. 10 is a diagrammatic view illustrating the method of controlling the registration of the label web relative to the cutting means and the operation of the latter.

It is believed that a better understanding of the aforesaid operation will be understood from a consideration of FIG. 10 of the drawings which shows a portion of a label web W of a length containing two repeat lengths designated 40 and 41 and each of which is provided with five labels. Two of the labels 42, 42 and 43, 43 in such repeat lengths 40, 41, respectively, are spaced from each other and the remaining three labels 42', 43', respectively, by space increments 44, 45, respectively. The remaining labels 42' and 43' are connected together in abutting relation. Associated with each of the labels 42, 42', 43 and 43' are control elements 46 for controlling the registration of the labels with the fixed or continuously operable set of knife blades 35, 36 only the former of which is indicated in FIG. 10 and which are located in an adjusted position relative to the line of feed of the web dependent on the size of the labels. Associated with the set of knife blades 35, 36 is the intermittently operable or adjustable set of knife blades 37, 38, only the upper one of which is indicated in FIG. 10, and which are spaced from blades 35, 36 a distance equal to the height of the increments 44, 45. Control elements 47 for controlling the operation of the blades 37, 38 are located on the web in advance of the increments 44, 45. In the arrangement shown, the control elements 46 and 47 are aligned along one edge of the web making it possible to employ one scanning device to control both the registration of the labels and the operation of blades 37, 38. It will be understood, however, that the knife signal control elements 47 may be placed on the web in non-aligned relation with the register control elements 46 so that in situations where it is considered desirable two scanning devices may be employed; one to control the registration of the labels and the other to control the operation of blades 37, 38. A scanning unit 48, which preferably comprises at least one scanning device constituted of an electric eye, is located at least one repeat length of web upstream from the set of cutting blades 35, 36. With a printing plate dimensioned as the plate 21 previously discussed, the scanning unit or device 48 would be positioned upstream from the cutting blades 35, 36 exactly 18 inches so that it will be scanning a control element 46 located the repeat length of web 41 at the same time a similarly located control element 46 in the repeat length of web 40, is positioned at the line of cut of the blades 35, 36.

With the foregoing in mind and assuming that the direction of label feed is to the left, as viewed in FIG. 10, it will be understood that in the operation of the apparatus, the web W will be fed by the web feeding means of the label machine in a step-by-step fashion so that in the periods of dwell thereof the register control elements 46 associated with the terminal labels will stop at the line of cut of the blades 35, 36 and another register control element 46, one repeat length back of such registered control element in the repeat length of web 41, will stop at the scanning device 48. This step-by-step registration of two similarly located register control elements in the two repeat lengths of label web and spaced one repeat length apart, will occur during each period of dwell in the feed of the web W. The step-by-step movement imparted to the web by the web feeding means is controlled by the scanning means 48, which every time a register control mark 46 is scanned thereby causes the sending of a signal to the web feeding means to stop the feed of the web. The set of knife blades 35, 36 are thereupon automatically operated to sever the terminal label 49 from the web. Between the periods of dwell the knife signal control elements 47 also will pass by the scanning means 48 and cause the latter to send a signal that will effect the unlatching of the set of blades 37, 38 so that on the next operation of the two sets of blades they will cut double to remove a chip of paper, as has been explained. Wherever in the web there is not provided a control element 47 between two control elements 46 because there is no following increment 44 or 45 to be removed, there will be no transmitted signal for unlatching the blades 37, 38 and the blades 35, 36 only will operate to make a shear cut.

The scanning means 48 performs an additional function through the register control elements 46 as the label web travels through the machine. Located approximately one repeat length of web in back of the scanning means 48 is an imprinter 50 which is positioned so that the same given area portion 51 of successive labels will come into the field of printing of the imprinter 50 as the web successively stops because of the registry of the control marks 46 with the scanning device 48. When the scanning device 48 sends a signal to stop the feed of the web, it simultaneously sends a signal to the imprinter 50 causing it to operate to imprint on the area portion 51 of a label the information that is required to be added to a label at the time it is being applied to a container for a given product and which in the case of pharmaceutical products may be the batch number of the material being packaged, the expiration date for the safe use of such material, the date of packaging, etc. This information is usually applied to a label in the form of a code number.

Considering the aforesaid system of operation as a whole, it may be noted that at the start of a cycle of operation of the labeling machine, the construction is such that the electrical circuit in which is contained the scanning device 48 is switched to the set of blades 37, 38 so that in the initial travel of the web through each step-by-step movement thereof from a period of dwell, the scanning device 48 will look for a knife control element 47 on the label being scanned. If the scanning device detects a control element 47 it will send a signal to cause the unlatching of the set of blades 37, 38 as aforesaid, and if no control element is detected the circuit remains inactive. Shortly after the period in which a control element 47 should be detected, if present, on the label being scanned, the electrical circuit is switched to control the feed rolls of the feeding means and the imprinter 50. When the scanning device now detects a control element 46, it will simultaneously stop the feed rolls and actuate the imprinter to print a code number on the given area portion 51 of a label during the dwell of the web. The circuit is constructed so that if the scanning device does not send a signal as a result of its detection of a control element 46 within a given period of time after such signal should have been received and before the termination of the cycle of operation of the machine, the circuit operates to stop the machine.

The register control elements 46 and the knife control elements 47 are provided on the label web W at the time the labels are printed thereon and may be in the form of punched holes, or in the form of suitable indicia printed on the web. If such control elements are to be in the form of punched holes, such holes are provided in the web in a known manner by the punching unit 16 of the printing press shown in FIG. 1 of the drawings after the labels have been printed on the web and a protective coating has been applied to such web.

If the control elements 46, 47 are to be applied to the web in the form of printed indicia, such indicia may be visible to the human eye, or to detecting means under ambient light or light of a given wave length, or such indicia may be invisible to the human eye or to detecting means under ambient light, but visible under a light of a given wave length. Such indicia also may be composed of a combination of such visible and invisible indicia, and whether visible or invisible as aforesaid may be detectable by other means such as optical-electrical and magnetic-electrical detecting means. Thus, the indicia may be composed of the visible printing inks employed in printing the labels and if such indicia does not form a desired part of the printed label itself, the latter is preferably located on the label web outside the areas of label indicia thereon. Also, and especially in the case of verification, the indicia may be composed of characters which form part of the printed label and which may readily be recognized optically from the remaining printed characters on the label. Further, in accordance with the invention, the control elements may be applied to the label web with inks which are different from the inks usually employed in printing the labels and have characteristics which enable them to be readily distinguished by the scanning means from the usual printing inks. For example, it has been found that known magnetic or luminescent inks may be employed for these purposes. The luminescent ink employed may be in the form of an invisible fluorescent ink of a type such as are now available to the art. Inks of this type cannot be seen by the human eye in ordinary daylight and may therefore be applied anywhere desired on the printed label without regard to the label indicia printed thereon. Different kinds of these invisible luminescent inks may be recognized by different photo tubes according to their spectral sensitivity characteristics and this quality may be taken advantage of to use particular luminescent inks for different kinds of products. Thus, for a given product a luminescent ink that would emit red light could be applied to labels for such product. Accordingly, if labels carrying control elements made of a luminescent ink having a different spectral characteristic were placed in the machine, the machine could not be started and the error in the use of the wrong labels would be detected. By this means label verification as well as control of operating instrumentalities in the labeling machine can be developed according to the requirements desired of the labeling machine in the uses thereof. The luminescent ink may also be a visible fluorescent ink of a type such as is known to the art. Certain of these inks have the quality of becoming invisible when light is excluded and become excited under certain spectral wave lengths, such as ultra violet light. It is also possible to use inks of the phosphorescent variety to good advantage on the label webs.

Figure 11:
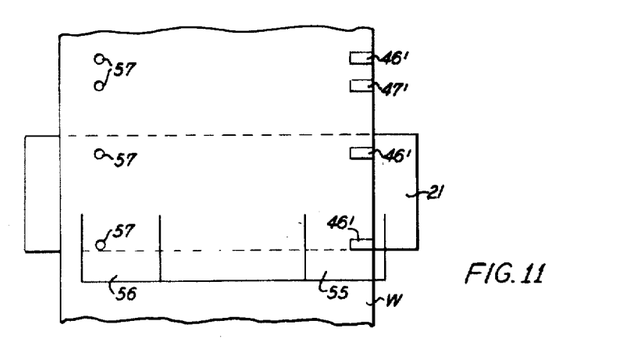
FIG. 11 is a partial schematic top view showing the manner in which a split ink fountain may be associated with the printing plate in accordance with the invention.

In order to keep visual track of the registration between the visible printed inks employed in the label indicia and the control elements made of invisible luminescent ink, there may be provided on the label web in combination with the invisible control elements, visible elements or marks which will enable the press operator to be sure that the invisible mark is being printed. This may be accomplished by providing the printing press with a split ink fountain arranged to have both the visible and invisible inks picked up by the offset plate. Thus, as shown in FIG. 11 of the drawings, the offset printing plate 21 picks up from the fountain portion 55 the invisible ink which is to be used to produce the control elements 46', 47' on the web W, and picks up from the fountain portion 56 the visible ink which is to make up the visible portion of the mark, for instance, circles 57 printed along the margin of the web in registration with the invisible control elements 46' and 47'. These visible register circles may be trimmed off the web in the slitting and rewinding unit 17 of the press or may be applied to portions of the web which are to be cut out when the labels are severed therefrom in the label machine. As the labels are being printed with the invisible inks they should be regularly examined by an ultra-violet light testing device attached to the printing press so that the effectiveness of the register mark can be checked out at the time of printing. This can be done on a stroboscopic basis with the testing device movable over the printing range so that the labels can be checked out during the run. In order to get the stroboscopic light to function properly when the labels are not uniformly spaced, the light must be triggered by the register marks 46. This means that the register marks 46 and the knife action marks 47 must be in different channels for this purpose.

The scanning device which may be employed for labels having punched holes preferably is an electronic pick-up device of the "look through" type in which the detecting beam of light passes through a punched hole to a receiver as the hole comes into registry with the device. Scanning devices of the reflective type may be employed when the control elements are printed on the web. When using the type of verification indicated in FIG. 18 of the drawings, the "look through" type of scanning is the simplest approach because the ink spots will always be located on clear, unprinted portions of the paper, i.e., no opaque inks will be printed in the areas used to print such verification spots or control marks. It has also been found, that in the use of luminescent inks which are to be detected by their spectral characteristics, the "look through" type of scanning device can be used to best advantage in connection with labeling machines. In this method of detection for invisible control elements, the light source for generating the particular wave length desired for a given type of luminescent ink is on the side of the web on which the luminescent ink is printed, and pick-up tube having the necessary qualities to receive the light passing through the paper is located on the other side of the web so that the control elements pass between such source and tube. When printing the control element to be used in connection with the "look through" method of detection, it is desirable to print the invisible ink on a potrion of the label where no substantial portion of the visible opaque inks used in printing the label indicia overlap the control element. It has been found practical to make the size of the control element approximately ³⁄₃₂" x ½", the ½" dimension being preferably across the direction of movement of the web.

Figure 12:
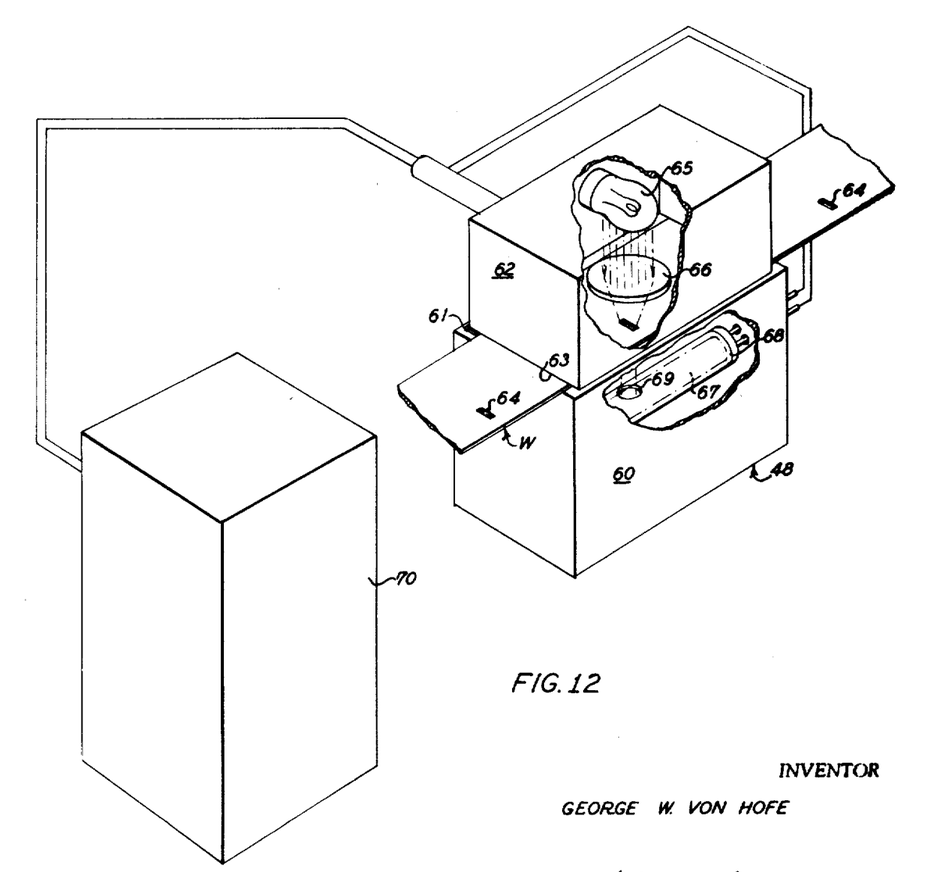
FIG. 12 is a diagrammatic, perspective view of the scanning means employed for detecting luminescent control elements.

FIG. 12 of the drawings illustrates a scanning device that has been found particularly advantageous in scanning luminescent control elements by the aforesaid "look through" procedure. This scanning device includes a box-like base 60, to the top wall of which, is pivotally connected by means of a hinge 61, a box-like cover 62. The bottom of the cover 62 is open and the end walls thereof are provided with slots 63 through which the label web W passes in its feed through the label machine. As the web travels through the scanning device, it rests on the top wall of base 60 which is provided with an opening of larger area than that of the luminescent control elements 64 provided on the label web. Mounted in the cover 62 above such opening is a bulb 65 for creating the spectral light beams of the desired wave length, for example, ultra-violet light. The light beams created by the bulb 65 are directed through a lense 66 which concentrates the beams into an area substantially equal to the area of the control elements 64 and causes a control element coming into registry therewith to visibly glow. The visible light created by the ultra-violet light passing through a luminescent control element 64 passes through the paper of the web and through the opening in the top wall of the base 60, and is picked up by a receiver of phototube 67 located in the base 60 and contained in a metal cylinder 68 provided with an opening 69 to permit the passage of such visible light to the receiver. The interior walls of the base 60 are painted black and the construction of the base and cover is such that substantially all ambient light is prevented from entering into the interior of the scanning device. Power for the bulb 65 and the phototube 67 is supplied from a power supply box 70 which also amplifies the signal received from the phototube 67 and sends it to a solenoid such as the solenoids 71 and 110 provided in the label machine construction shown in FIG. 13 of the drawings.

Figure 13:
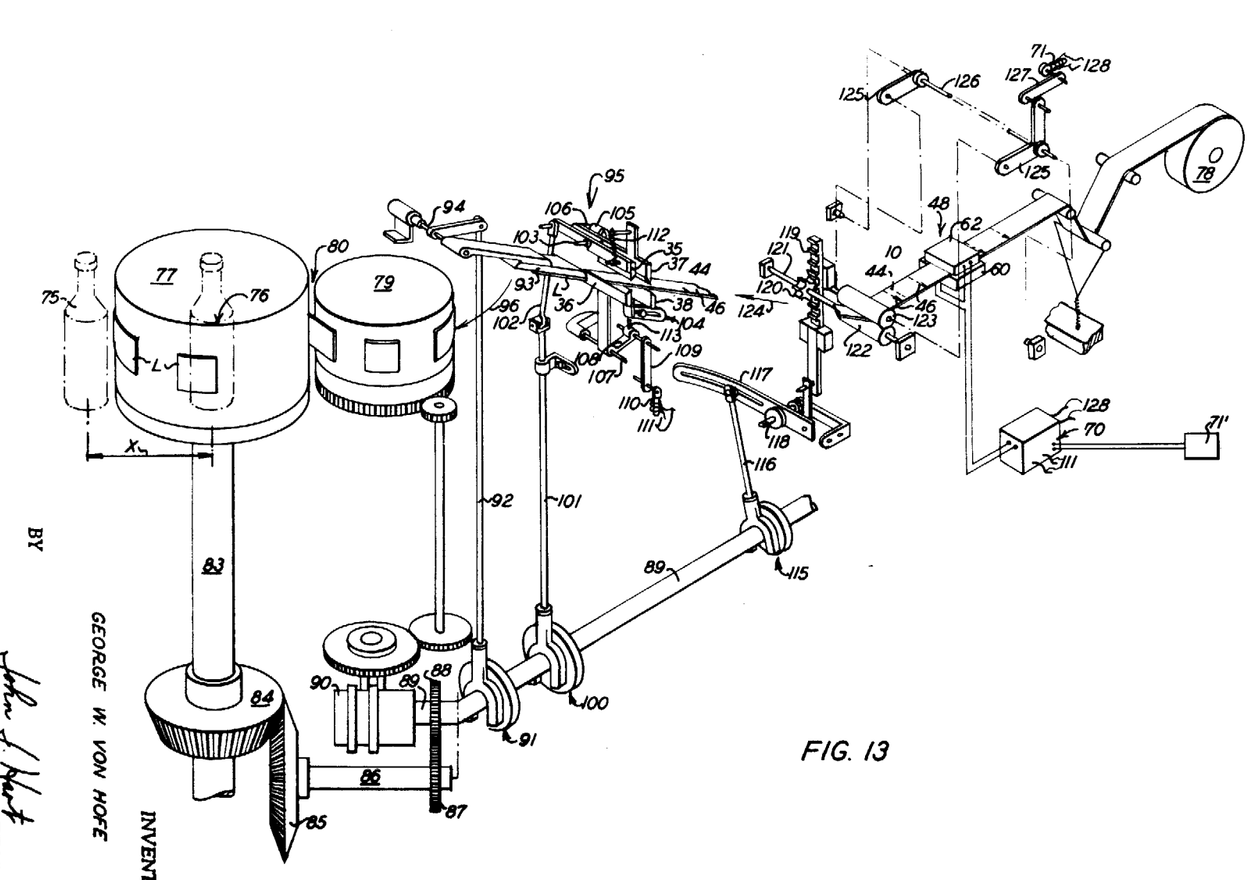
FIG. 13 is a diagrammatic, perspective view showing the manner in which the several devices may be associated with the label web in a labeling machine.

FIG. 13 of the drawing shows by way of example the invention herein embodied in a label machine essentially similar in construction to the labeling machines described and illustrated in the Von Hofe Pats. 2,525,741, issued Oct. 10, 1950 and 3,140,214 issued July 7, 1964. Like the machines of the aforesaid patents, the instant machine includes a conveyor for advancing the containers, such as the bottles 75, in a single file to the right, as viewed in FIG. 13, and past the label applying station 76 in the machine at which the labels L are applied to the bottles. The labels are applied to the bottles from an endless conveyor or drum 77 which carries the labels to such station. The labels are fed to the drum 77 from a single source or roll 78 through a pick-up mechanism which comprises a rotatable cylinder 79 and which transfers the labels to the drum 77 at a transfer station 80. The drum 77 and cylinder 79 are essentially similar in construction to the corresponding drum and cylinder in the apparatus shown in the aforesaid Von Hofe patents and cooperate in the same manner to transmit, ready and apply the labels to the bottles. The attachment of the labels to the bottles is completed in the same manner disclosed in the aforesaid patents.

As in the labeling apparatus shown in the aforesaid patents, the drum 77 is rotated continuously by mechanism which includes a driven vertical shaft 83 and which has connected thereto a gear 84 that meshes with and continuously drives a bevel gear 85 provided on one end of a rotatable shaft 86. Affixed to the other end of shaft 86 is a gear 87 which drivingly engages a gear 88 secured to a horizontal cam shaft 89. Mounted on one end of shaft 89 is a cylindrically-shaped cam 90 which is connected to and is designed to drive the cylinder 79 with an intermittent rotational movement. The continuously rotating cam shaft 89 is also provided with a cam 91 to the strap of which is connected the lower end of a link 92 and which advances and retracts such link vertically as the shaft 89 rotates to swing a vacuum label transfer device 93 about a pivotal axis 94. The label transfer device 93 receives a severed label L from the cutting mechanism generally designated 95 and transfers it to the cylinder 79 in the manner indicated by the arrow 96.

The continuously rotating cam shaft 89 is provided with a second cam 100 which is connected by links 101, 102 to one end of the cutting blade 35 mounted for pivotal movement on a shaft 103 that is secured in a given position for a particular operation of the machine. As has been previously described the blade 35 cooperates with a cutting blade 36 to sever the label web W whenever blade 35 is actuated by the cam 100 through the links 101 and 102. As has also been described, the set of blades 35, 36 have associated therewith a set of blades 37, 38 which are mounted for movement as a unit along the direction of travel of the web to adjust for different widths of cut. To accomplish this adjustment, blade 37 which is slidably mounted on the pivot shaft 103, is moved in one direction or the other on such shaft 103 through a manually operable micrometer device 104 which is also utilized to secure the blades in adjusted position for cutting out of the web the increments 44 provided therein (compare the web shown in FIGS. 10 and 13). The set of blades 35, 36 and 37, 38 in their adjusted relation are movable as a unit along the length of the web to vary the bottom portion of the label on the article to which it is applied. The operation of the pivotal blade 37 of the set is controlled by a latch 105 which normally engages with a lug 106 provided on the end of blade 37 to prevent pivotal movement of such blade about the pivot shaft 103. The latch 105 is pivotally mounted on a fixed shaft 107 and is provided with an arm 108 connected by a link to a solenoid 110. The solenoid is connected by wiring 111 to the power supply box 70. It will be understood from the previous description that, when in a cycle of operation of the machine, the electrical circuit is switched to control the knife and a signal is received by the power supply box 70 from the phototube 67 of the scanning device as a result of a knife control element 47 in FIG. 10 passing through the ultraviolet light beams projected toward the label web, such signal is amplified in the power supply box 70 and sent through the wires 111 to solenoid 110 causing it to pull down link 109 and pivot latch 105 about pivot shaft 107 to the right, as viewed in FIG. 13, to its unlatched position, thereby releasing blade 37. Blade 37 is connected to blade 35 by a spring 112 which is sufficiently strong to pivot blade 37 to cut the label web when blade 35 is actuated to perform its cutting operation. This simultaneous cutting action of blades 35 and 37 will cut an increment 44 from the web and sever the leading or terminal label from the web. After a given time interval solenoid 111 is deenergized and latch 105 swings back into engagement with the lug 106 under the influence of spring 113 to render the set of blades 37, 38 inoperative until the next knife control element is detected by the scanning device 48.

The continuously rotating cam shaft 89 is provided with a third cam 115 which is adjustably connected by a link 116 to one arm of a lever 117 mounted for oscillating movement about the axis of a shaft 118. The other arm of lever 117 is connected to the lower end of a rack 119 engaged with a pinion 120 provided on the shaft 121 of a driven web feed roll 122. It will thus be understood that as cam shaft 89 continuously rotates feed roll 122 will be rotatably reciprocated through cam 115, lever 117, rack 119 and pinion 120. When the feed roll 122 is rotated in the direction of feed of the web W, its associated feed roll 123 will be closed or engaged therewith to draw the label web from the supply roll 78 and advance it toward the cutting mechanism as indicated by the arrow 124. The periods of dwell in the tape are attained by withdrawing the feed roll 123 from cooperative engagement with roll 122 and during such periods roll 122 will be rotated in the opposite direction. The feed roll 123 is rotatably supported on a pair of arms 125 secured to a shaft 126. One of the arms 125 is L-shaped and connected by a link 127 to the armature of the solenoid 71 which is connected by electric wiring 128 to the power box 70 and which, as has been previously described, is actuated by a signal from the power box to lift the feed roll 123 every time a register control element 46 in FIG. 10 comes into registry with the scanning device 48. As has previously been indicated, the power box 70 contains electrical and/or mechanical means in a manner known to the art for switching the electrical circuit at given intervals so that signals transmitted thereto by the scanning device as a result of reading either a control element 46 or a control element 47, will be used to control either the roll feed solenoid 71 or the knife control solenoid 110, respectively. As has been previously indicated, any form of scanning device suitable for scanning the particular control elements that are provided on the web may be used, and by way of example, there has been shown in the construction of FIG. 13, the scanning device of FIG. 12 which, as has been described, has been designed in accordance with the invention to control the advancement and cutting of a label web W provided with luminescent control elements.

Figure 9:
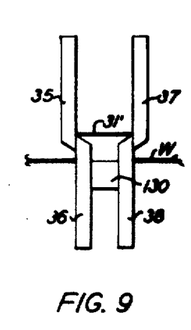
FIG. 9 is a view similar to FIG. 8, but showing the adjusted blades cutting the wider chip.
Figure 14:
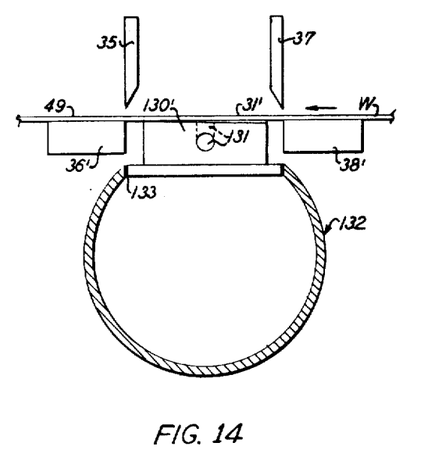
FIGS. 14 to 17 are diagrammatic views showing in vertical section the manner in which the chips cut from the web may be removed from the machine.
Figure 15:
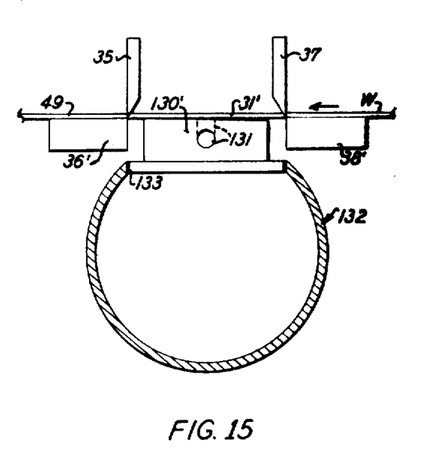
Figure 16:
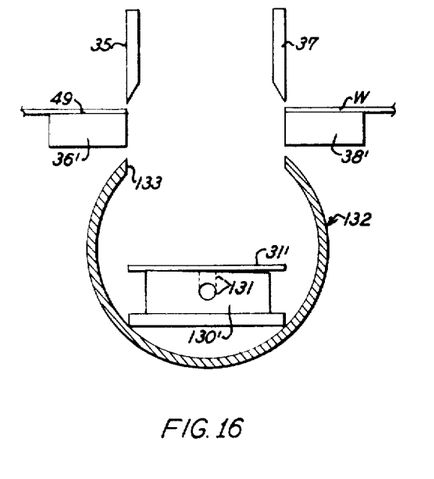
Figure 17:
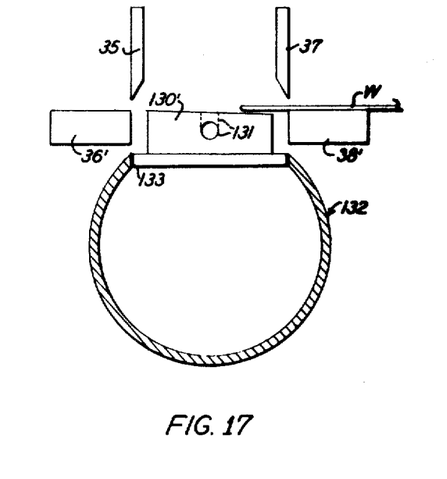

While in the showing of FIG. 13, the upper blades 35, 37 are illustrated as the blades that are actuated to perform the cutting operations, it will be understood that the construction may be modified to have the blades 36, 38 actuated to perform such operations as is illustrated in FIGS. 4–9 of the drawings. Also when the increments to be cut out of the label web by the two sets of blades are relatively large due to the widening of the gap between such two sets of blades, a problem arises in connection with the feed of the label web, namely, the tendency of the severed end of the web to drop into the space between the two sets of blades on the next advance movement of the web. This problem is solved in accordance with the invention by providing a removable web supporting plate between the lower blades 36, 38 of the two sets thereof. Thus, as is shown in FIGS. 8 and 9, the removable plate 130 may be located between the spaced actuatable blades 36, 38 so that its upper surface supports the label web in its path of feed. The upper surface of plate 130 has a width approximately equal to the width of the space between the blades 36, 38 and may remain stationary during the operations of such blades; the cut chips 31′ being removed upwardly between the blades 35, 37 with the aid of vacuum as shown in FIG. 7. As is shown in FIGS. 14 to 17 of the drawings, the plate 130′ may be associated with stationary blades 36′, 38′ or die members which cooperate to support the label web W in its feed between the two sets of cutting devices as is shown in FIG. 14 of the drawings. Preferably, also, the plate 130′ is provided with suction passages 131 which are connected to a source of suction composed of a valve operable in a manner known to the art to control the vacuum in such plate passages 131. The plate 130′ is in the nature of a movably mounted finger and is associated with means to move such finger from a raised position in which it is supporting the label web (FIG. 14) to a depressed or retracted position in which such finger is located in a vacuum tube 132 connected to said source of suction so that the vacuum therein is continuous. The finger or plate 130′ moves through an opening 133 in the tube 132 and is formed to close such opening in the raised position of finger 130′. It will be thus understood, that when the finger 130′ is in its raised position its upper surface and the upper surfaces of the dies 36′, 38′ will be in alignment to support the label web in its feed to advance the terminal label 49 into proper registration with the cutting mechanism. During such feed of the web, suction will be cut off to the finger 130′ and the vacuum tube 132 will be sealed by such finger so that the label web will not be disturbed in its feeding movement. When the label 49 is properly registered and the cutting mechanism operated as previously described and as is shown in FIG. 15 to cut the increment 31′ from the web, the passages 131 in the finger 130′ will be connected to the source of suction so that the increment is secured by vacuum to the finger 130′. As the blades 35, 37 raise, the finger 130′ is lowered into the vacuum tube 132 pulling the severed increment 31′ into the vacuum tube as shown in FIG. 16 of the drawings. The suction to finger 130′ is then cut off, enabling the severed increment 31′ to float off in the vacuum tube 132 which removes it from the machine. The severed label will be transferred by the vacuum device 93 to the feeding cylinder 79 in the manner previously explained. The finger 130' with the vacuum cut off will then be raised to assist the leading end of the label web in its feed across the gap as shown in FIG. 17 of the drawings.

Figure 18:
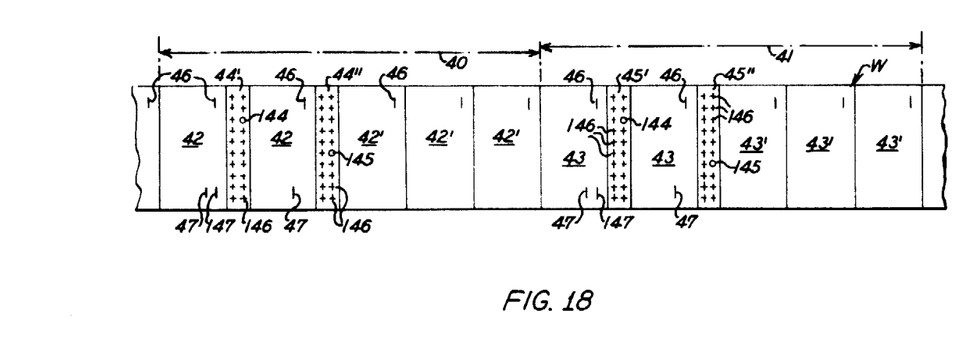
FIG. 18 is a plan view of a portion of a printed label web provided with verifying symbols in the sections thereof to be removed.

FIG. 18 of the drawings illustrates another arrangement of the control elements 46, 47 and the manner in which the space increments 44 of FIG. 10 may be employed for the location of the label verification marks whether constituted of punched holes, or of a visible, or invisible ink. The strip of web shown in FIG. 18 includes as in FIG. 10 of the drawings, two repeat lengths 40 and 41 each provided with five labels 42, 42' and 43, 43' respectively. Associated with each label along one longitudinal edge of the web is a control element 46 for controlling the registration of the labels with the knife blades. The control elements 47 for controlling the operation of the knife blades are located along the other longitudinal edge of the web. The increment areas 44' and 45' of the repeat lengths 40 and 41, respectively, and the increment areas 44", 45" of such repeat lengths, respectively, are utilized for the location of the label verification marks 144, 145, respectively. It will be noted that there is one mark 144 and one mark 145 in each repeat length of the web and that the marks 144 and 145 are offset longitudinally. Accordingly, all of the labels in each repeat length can be verified by scanning the two marks in each repeat length and both of such marks must be scanned in order to provide proper verification. The + marks 146 in the increment areas 44', 44", 45', and 45" indicate other possible positions in which the verifying control elements or symbols may be located in such areas. Located in alignment with the control elements 47 is a control element 147 in each repeat length 40 and 41 for triggering the verifying device to read both increment areas in each repeat length simultaneously. Inasmuch as the control marks 144 and 145 are offset longitudinally the verifying device will be provided with two electric eyes for the reading of such marks.

It will be understood from the foregoing, that as the web W is fed in a step-by-step fashion to the left as viewed in FIG. 18, the control elements 46 will be scanned by one electric eye which will control the feed of the web to cause the trailing edges of the terminal labels to stop at the line of cut of the cutting blades. Another electric eye will scan the control elements 47 to effect the unlatching of the set of blades 37, 38 to cut away the increments 44', 44", 45', 45", etc. This second electric eye will also scan the mark 147 provided on each repeat length of web to cause the two electric eyes provided to read the marks 144 and 145, to read the latter simultaneously before the first increment 44' or 45' is cut out by the set of blades. As only one of these control marks 147 occurs in every repeat length of the web, the two electric eyes in the verification scanner must be triggered to read such marks 144, 145 just after the knife electric eye gets the signal from the mark 47 associated with the first increment 44' or 45' in the repeat length that is coming up. If the two verification eyes find the marks 144 and 145 the machine will continue its normal operations. Should the marks or control elements 144 and 145 not be found by the verification device, the means associated therewith will operate to stop the machine. The second knife control elements 47 associated with the increments 44" and 45" do not have a verifying control element associated therewith so that the verification scanner will not be readied for operation after such scanned elements 47 have been read. The above referred to four electrical eyes, or other scanning means, such as the scanning means shown in FIG. 12 of the drawings, may be contained in a single scanning device 48 and instead of utilizing an electrical circuit switching means in the power box 70, the electrical circuit of the latter may be constructed in a known manner, to send the amplified electrical impulses from the scanning means associated with the control elements 46 directly to the roll feed solenoid 71, to send the amplified electrical impulses from the scanning means associated with the control elements 47 and 147 directly to the knife solenoid 110, and to send the amplified impulses resulting from the combined readings of the verification marks 144 and 145 by the two scanning means associated therewith, to either the roll feed solenoid 71, or to a switch controlling the motor circuit, or to a light or sound signal, such switch, light, or sound device being indicated generally in FIG. 13 of the drawings by the reference numeral 71'.

When the control or verification marks are constituted of magnetic ink, the scanning device 48 is preferably constituted of one or more magnetic detectors, their number depending on whether such marks are contained in one or more lines extending longitudinally of the label web. As is show in FIG. 19 of the drawings, the scanning device may include a base 150 over which the web W is drawn in the direction of the arrows between two side guides 151 for maintaining the moving web in proper registry with the magnetic detector or detectors. A pole piece 152 in the form of a permanent magnet is arranged to overlie one or more longitudinal lines of marks on the web in position with respect to the web so that as the latter passes therebeneath the magnetic ink in the characters or marks 156 constituted thereof will become magnetized. The web then passes beneath a split-ring-shaped highly permeable magnetic core 153 having a coil 154 wound around its central portion. The coil 154 is connected to the power supply box 70. It will be understood that as the magnetized ink material in a control or verifying character or mark passes by the narrow space between the legs of the core 153 in the feed of the label web, the lines of force created by the coil 154 will be disturbed to the extent that an electrical pulse is created. This pulse is conducted to the power box 70 where it is amplified and then transmitted by the wires 155 to a suitable device, such as the solenoids 71 or 110 or the motor circuit switch, or signal device 71'.

Figures 19, 20:
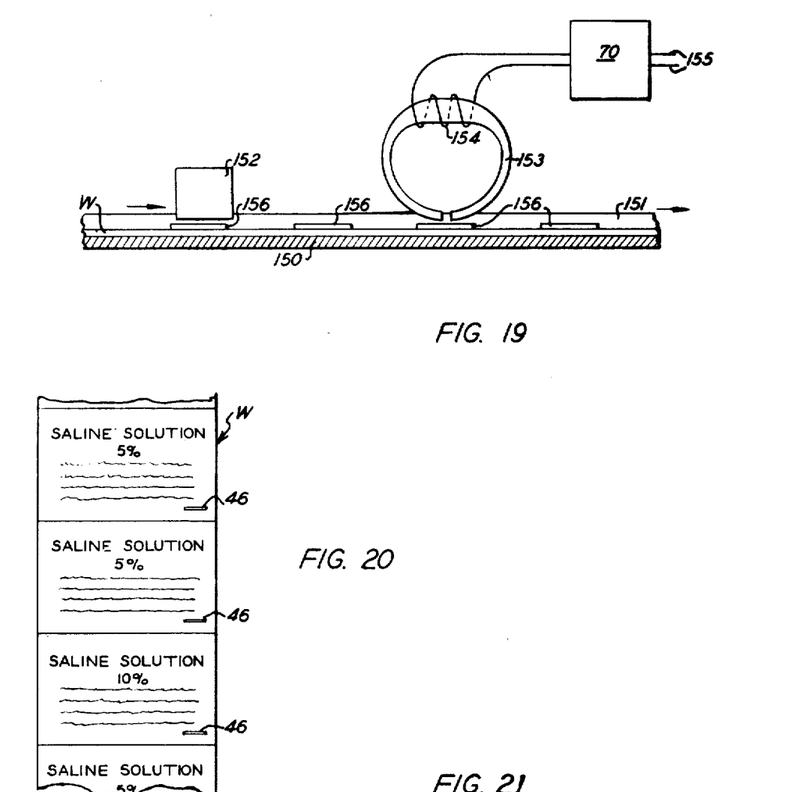
FIG. 19 is a schematic, elevational view, partly in section, of a scanning means for detecting characters printed on the web with magnetic ink.
FIG. 20 is a plan view of a portion of a label web provided with feed control elements and optically recognizable characters.

When the labels are printed so that they can be checked by optical character recognition as previously indicated, it is necessary to utilize a still different type of scanning device. It might be pointed out at this time, that this method enables the checking of the labels without the necessity of applying to the labels verification control elements or special coding characters and of maintaining complicated and costly records of the different coding systems used. For instance, as is indicated in FIG. 20 of the drawings, if a production line in a pharmaceutical plant is putting out a product that varies only in the strength of solution, say 5%, 10% and 15% solutions, the labeling machine may be set up to optically recognize in the first instance the character 5, and in the second instance the character 10, and in the third instance the character 15. Thus, if by any chance the labels become mixed in a roll, the labeling machine would be arranged to shut down if it had been set to recognize the character 5 and 10 or 15 appeared. In those labels that do not bear a simple numeral to scan, the optical character recognizer could be set to read the title of the label, such as the term "Aspirin." If by chance an "Acetanilide" label, or any label that did not carry the term "Aspirin" in the particular font of type used on the particular "Aspirin" label, became spliced in the label roll, the machine would be shut down, or the operator's attention would be called in any desired manner to the fact that something is amiss with the labels. Also the amount of the label which the optical character recognizer or scanner would be arranged to recognize will depend to some extent on the type of material being labeled and the various ways in which it is packaged. For instance, Aspirin is packaged in various flavors, varying weights, and different quantities. Accordingly, it become necessary to have the scanner include other portions or the whole of the label in its operation. For example, the scanner might be set to recognize the word "Aspirin" in a given size and font of type, the weight of a tablet might be set as a number of a given size and font of type, and the characters indicating the flavor and quantity of the tablets in a container might also be set up in given sizes and fonts of type.

Figure 21:
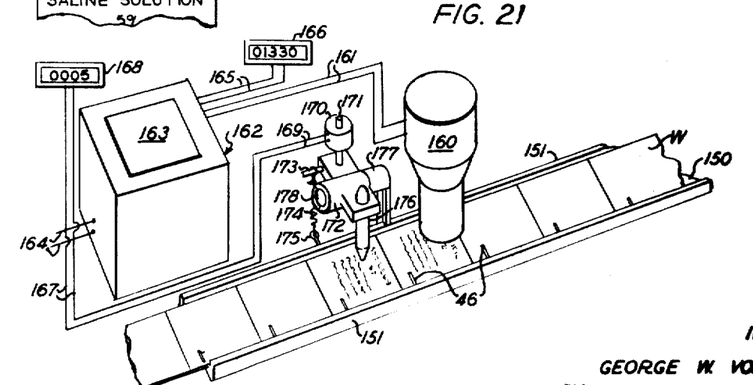
FIG. 21 is a diagrammatic, perspective view of optical-electrical scanning means for a label web.

Considering now the disclosures of FIGS. 20 and 21 of the drawings, FIG. 20 shows a label web W having labels provided with the previously discussed register control elements 46 to control the feed of the web so that the labels will properly register with the cutting mechanism in the step-by-step feed of the web, as has been explained. The labels shown are for containers filled with a 5% saline solution, but through inadvertance, one label for a 10% saline solution has been spliced in the roll. The scanning unit has been arranged to scan the area occupied by "Saline Solution 5%" and to recognize these particular characters, so that when it scans the area occupied by "Saline Solution 10%" it will reject "10%" as an unrecognizable character and call the attention of the operator to this discrepency in the manner above indicated.

The scanning device employed for this purpose may be constructed to employ any one of the several optical-electronic systems now used in the optical processing of records, checks, bills, etc. Generally, as shown in FIG. 21 of the drawings, such a device would include a label web support 150 and side guides 151 (note FIG. 19) to properly register the labels with the scanning tube 160. The tube 160 may be a known type of electronic scanning tube known as a vidicon and capable of optically scanning the area of the labels containing the characters "Saline Solution 5%." The vidicon is connected by electric wiring 161 to a comparator 162 of known construction and known as an image orthocon. The comparator contains a scanning tube arranged by the acid of electronic oscillators in a known manner, to scan in synchronism with the tube 160 a master label 163 which is a correct copy of the labels in the web W being checked and which is preferably placed face down on the top of the comparator, as indicated. In the event there is any difference between the label in the web W, as in the case of the label marked "10%," and the master copy 163, a pulse is sent out through the output wires 164 to cause the actuation of the roll feed solenoid 71 or a motor circuit switch and/or signal device as indicated in FIG. 13 by the numeral 71'.

FIG. 21 of the drawings also illustrates additional features of the invention relating to the use of counting devices in the verifying circuit. Due to the ever increasing controls being applied by the drug manufacturer in an effort to eliminate errors as well as to prevent the pilfering of genuine labels from a reputable drug manufacturer and the risk of getting them into the hands of people working outside the pale of government control, it is necessary to keep an accurate count on every label issued by the label control group to the manufacturing floor. In order to exercise this type of control it has been found necessary to issue a counted roll of labels and to keep a constant check on the number of such labels as they are being used in the labeling machine. This check on the number of labels must cover not only the labels that were verified and used, but also the number of labels that were rejected.

Further, in the practical operation of a labeling machine it has been found that it is not always advisable to shut the machine down when a label has been rejected. This is especially true on very high speed lines. In such instances, in accordance with the invention, the verifying mechanism is so arranged that the labeling machine continues to run when a label has been rejected, but the signal is given to the attention of the labeling machine attendant who visually searches for the rejected label attached to a labeled article. In order to facilitate finding the rejected label the invention further contemplates providing means to mark the rejected label so that is can be readily distinguished from the rest of the labels, as will hereinafter be more fully explained.

To keep track of the labels scanned, the invention contemplates incorporating in the control circuit for the comparator 162 shown in FIG. 21 of the drawings, leads 165 connected to an electrically operated counter 166. This connection is such that when a label is brought to a pause in the step-by-step feed thereof under the control of the elements 46, a pulse is transmitted from the comparator 162 to the counter 166 to cause the latter to advance one count. This counter 166 therefore keeps track of the number of labels which are scanned during the production run. However, in the scanning process it may be found that certain of the labels are not recognizable by the comparator 162. This will result in the comparator sending a pulse into the wires 164 which, as has been previously explained, may either signal the attendant in any suitable manner, as by the signal device 71' in FIG. 13, or actuate a device in the labeling machine to control its operations. This pulse is also transmitted to wires 167 which in turn activates a counting device 168 for keeping track of the number of rejected labels. At the end of the run therefore, the attendant will have a reading of the total number of labels scanned and the total number of labels rejected, which numbers will give by subtracting the one from the other, the total number of labels or finished articles. Also by subtracting the total number of labels used from the quantity issued by the control group, the number left on the roll can be arrived at. The label control group then checks the number of returned labels, and if all totals check out the labels are completely accounted for.

The means provided in accordance with the invention to identify rejected labels so they can readily be found by the labeling machine attendant, is also shown in FIG. 21 of the drawings. As shown, such mechanism includes a solenoid 170 connected to the wires 164 which carry the signal that a label is rejected, by another pair of wires 169. The core 171 of the solenoid is connected to a movable lever 172 which is pivoted on a shaft 178 that is in turn mounted on a fixed bracket 177 attached to a part of the labeling machine. Mounted on an arm of the level 172 is an aniline marking pencil 176 of a color that will be different from the colors used in printing the labels, so that any mark made by the pencil 176 will be readily discernible. Also attached to the lever 172 is a spring pin 173 to which is attached one end of a tension spring 174, the other end of which is hooked in an eyebolt 175 mounted on a fixed part of the labeling machine.

From the foregoing, it will be understood that when the scanning tube 160 is called upon to scan a label that has been presented to such tube, the comparator 162 sends a pulse to the wires 165. Should a label be presented to the tube 160 that is not recognizable by the comparator 162 a second pulse is transmitted to the wires 164, 167 and 169. We have already explained the action of the pulse in wires 164 and 167. The pulse in the wires 169 will energize the solenoid 170 causing the core 171 to be moved and thereby rotating the lever 172 against the pull of the spring 174 to force the tip of the aniline ink pencil 176 into contact with the rejected label to put an identifying mark on the rejected label. As soon as the pulse dies and the solenoid is deenergized, the spring 174 will return the aniline ink pencil 176 to its normal retracted position in which is out of contact with the label web. As previously explained, the distinguishing mark placed on the rejected label by the pencil 176 will readily be recognized by the operator whose attention has been called to the existence of such a label by the operated signal.

While I have hereinabove described and illustrated in the accompanying drawings a preferred embodiment of my invention, it will be apparent to those skilled in the art that various changes may be made therein without departing from the spirit of the invention and that certain of the features thereof may be employed to control means in a labeling machine other than the feeding and cutting means described. Thus, the control elements and scanning means described may be employed solely for label verification and may be utilized for this purpose to control the operation of the labeling machine, or even with mechanism other than a labeling machine.

What is claimed is:

1. The method of labeling containers for a given product, which comprises feeding toward the place for application of the labels to the containers, a continuous length of label web having visibly printed thereon labels for such given product and having in association with each of such labels at given localized areas of the web a control element printed on the web using an ink different from the inks employed in printing the label indicia and having an unapparent, but detectable characteristic peculiar to such ink, and as such label web is moving toward the place of label application exposing the web to scanning means capable of detecting the control elements through the peculiar characteristic of the ink forming such control elements and upon detection thereof creating control signals, and utilizing such control signals to exert at a place in the path of movement of the labels beyond the place where said control elements are detected, a selective controlling action on the labels resulting in a sorting of the labels having such control elements thereon from labels not provided with such control elements.

2. The method of labeling containers for a given product, which comprises feeding toward the place for application of the labels to such containers, a continuous length of label web having provided thereon given repeat lengths of labels with certain of the adjacent labels on said label web being in abutting relation and others of the adjacent labels on said label web being spaced by equal increments, and said label web having provided thereon a first control element associated with each of said labels and a second control element associated with each of said increments, successively scanning said first and second control elements in the order in which they appear on the label web in the feed of the web toward said place of label application and generating a control signal for each control element detected by said scanning means, using the control signals created by detecting said first control elements to successively register the trailing ends of the terminal labels on the web with a first label cutting means by control of said web feeding operation, and using the control signals created by detecting said second control elements to render operable a second label cutting means positioned relative to said first cutting means to cut the trailing end of any increment connected to the trailing end of a terminal label registered with said first cutting means, and transferring the severed labels to the place for application thereof to the containers for the given product.

3. The method of labeling containers for a given product, which comprises feeding toward the place of application of the labels to the containers carrying such product, a continuous length of label web having printed thereon labels for such given product, a portion at least of the printed material of each label containing characters optically recognizable, and as such web progresses toward the place of label application exposing the web to a scanning means capable of optically verifying the characters in each label to be recognized, and depending upon such verification thereof creating control signals, utilizing such control signals to exert at a place beyond the place where such characters have been verified, a selective controlling action on the labels resulting in a sorting of the labels having such verifiable characters from labels not provided with such characters, successively severing from the web those labels which have been optically recognized, and transferring the severed labels to the place for application thereof to the containers for the given product.

4. The method of labeling pharmaceutical products comprising the following steps, printing on a continuous web repeat lengths of labels for a given product containing the specifications of the product in recognizable characters, winding the printed web into a roll and visually examining the printed individual labels to detect printed labels that are not up to a set standard of printing, cutting the continuous web and removing the substandard labels from the web together with all labels which are associated therewith in at least one repeat length so that the labels in the remaining cut ends of the web will, when such ends are spliced, form one complete repeat length, splicing the remaining web ends to form such complete repeat length, rewinding the spliced web into a roll, placing the roll of spliced labels in a labeling machine, preparing the labeling machine to accept labels bearing the specifications in the recognizable characters used, advancing the web in the labeling machine, presenting a container containing the pharmaceutical product to be labeled, scanning the labels on the web one at a time for acceptable specifications and depending upon the acceptableness thereof creating control signals, severing an acceptable label from the web and applying the severed label to the container when a label is presented that checks out as a label bearing the specification in recognizable characters for which the labeling machine was prepared to accept, and utilizing such control signals beyond the place where the label specifications are scanned to exert a selective controlling action whenever a label is presented the characters of which are not recognizable as they are scanned to cause a sorting of the labels preventing the passing of unacceptably labeled products.

5. The method of labeling containers for a given product, which comprises feeding toward the place for application of the labels to such containers, a continuous length of label web having provided thereon given repeat lengths of labels with certain of the adjacent labels in each repeat length being in given spaced relation and other labels in such repeat length being differently positioned relative to labels adjacent thereto and said label web having certain control elements associated with each of the labels in each of such repeat lengths and other control elements located at positions dependent on the spacing between certain of the adjacent labels in such repeat lengths, locating means for scanning the control elements in back of the web severing means a distance at least equal to one repeat length of the web, successively scanning each of the control elements in the order in which they appear on the label web in the feed of the web toward the severing means and said place of label application and generating a signal for each control element detected by such scanning means, then utilizing such successive signals to selectively apply to the web a similar number of severing cuts in single and multiple relation dependent on the different spacings of the labels to successively sever the leading scanned labels therefrom so that they are all of the same size irrespective of their relation on the web, and transferring the severed labels to the place for application thereof to the containers for the given product.

6. In a label machine, feed means for feeding through the machine a continuous length of label web having printed thereon labels for containers of a given product and a control element in association with each of such labels, the label indicia being printed with visible ink, and the control elements being printed with ink different from that of the label indicia and having an unapparent, but detectable characteristic peculiar to such ink, means constructed and arranged to scan the web for such control elements at a place along the path of feed of the label web and including means capable of detecting the control elements through said peculiar characteristic of the ink forming such control elements and dependent upon detection thereof creating control signals, a selectively operable device located beyond the place where said control elements are detected for exerting a selective controlling action on the labels resulting in a sorting of the labels having such control elements thereon from labels not provided with such control elements, means controlled by said control signals for selectively operating said operable device, cutting means for severing labels from the web, and transfer means for transferring labels severed by said cutting means to a place for application of such labels to said containers.

7. In a label machine, feed means for feeding through the machine a continuous length of label web having provided thereon given repeat lengths of labels with certain of the adjacent labels on said web being in abutting relation and others of the adjacent labels on said web being spaced by equal increments, and said label web having provided thereon a first control element associated with each of said labels and a second control element associated with each of said increments, scanning means constructed and arranged to scan the web for said first and second control elements and including means automatically operative to generate a control signal for each control element detected by said scanning means, a first label cutting means for applying severing cuts to the web, a second cutting means for applying a severing cut to the web a distance spaced in back of the line of cut of said first label cutting means equal to the width of one of said increments, means controlled by the control signals created by detecting said first control elements to cause said feeding means to successively register the trailing ends of the terminal labels on the web with the line of cut of said first label cutting means, means controlled by the control signals created by detecting said second control elements to render said second cutting means operable to cut the trailing end of any increment connected to the trailing end of a terminal label registered with said first cutting means, and means for transferring the severed labels to the place for application thereof to the containers for the given product.

8. In a label machine as defined in claim 7, in which said first cutting means is secured in a given position relative to the line of feed of the label web for a given size of label, and including means supporting said second cutting means for movement relative to said first cutting means along the line of feed of the label web.

9. In a label machine as defined in claim 7, including means for automatically operating said first cutting means in each cycle of operation of the machine, latching means normally rendering said second cutting means inoperative, said means controlled by the control signals created by said second control elements controlling said latching means, and means connecting said second cutting means in its operable condition to said operating means whereby the latter simultaneously actuate said first and second cutting means in the operable condition of said second cutting means.

10. In a label machine as defined in claim 7, in which said scanning means is spaced in back of said cutting means at least one repeat length of said label web, and including printing means positioned in back of said cutting means more than one repeat length of said label web and so located relative to the labels on such repeat lengths as to come into register successively with the same given portion of successive labels on the web on registration of the terminal labels with said first cutting means, and means operable to actuate said printing means to print on a given label portion registered therewith, said operable means being operated by a signal from said scanning means wherenever the latter detects one of said first control elements.

11. In a label machine as defined in claim 7, including pneumatic means positioned between said first and second cutting means to remove an increment cut from the label web by such two cutting means.

12. In a label machine as defined in claim 7, including web supporting means located between said first and second cutting means and operable to support the leading end of the web in its movement across the space between said cutting means after a cutting operation by said second cutting means.

13. In a label machine as defined in claim 12, in which said web supporting means is movable between said first and second cutting means to transfer a severed increment from its position in the plane of feed of the web to a position for discharge thereof, and pneumatic means coacting with said movable web supporting means to remove from the machine the severed increment on such means.

14. In a label machine as defined in claim 7, in which said scanning means is spaced in back of said cutting means at least one repeat length of the label web.

15. In a label machine, feed means for feeding through the machine a continuous length of label web having provided thereon given repeat lengths of labels for containers of a particular product and with at least two successive labels in each repeat length separated by an increment of web material to be removed from the web, and said label web having provided thereon a first control element associated with each of said labels, a second control element associated with each of said increments, and a third control element located in a given location within each of said increments and constituting a label verifying mark for all of the labels in the repeat length containing such increment, scanning means constructed and arranged to scan the web for each of said control elements, a first label cutting means for applying severing cuts to the web, a second cutting means for removing said increments from the web, a first means operated by said scanning means on detection thereby of said first control elements to cause said feeding means to successively register the trailing ends of the terminal labels on the web with the line of cut of said first label cutting means, a second means operated by said scanning means on detection thereby of said second control elements to render said second cutting means operable to remove said increments and the third control elements located thereon, and third means operated by said scanning means to render said label machine inoperative to apply labels when said scanning means finds an increment without a properly located third control element, and means for transferring the labels severed by said cutting means to a place of application to containers.

16. In a label machine, feed means for feeding through the machine a continuous length of label web having provided thereon repeat lengths of labels for containers of a particular product and with at least two increments of web material to be removed from the web separating successive labels in each repeat length, and said label web having provided thereon a first control element associated with each of said labels, a second control element associated with each of said increments, and third control elements located in given locations within each of said increments, the third control elements within said two increments in each repeat length being located to provide a combination unique with respect to the particular labels in such repeat length for said product and different from such a combination for labels for a different product, a first label cutting means for applying severing cuts to the web, a second cutting means for removing said increments from the web, a first means operated by said scanning means on detection thereby of said first control elements to cause said feeding means to successively register the trailing ends of the terminal labels on the web with the line of cut of said first label cutting means, a second means operated by said scanning means on detection thereby of said second control elements to render said second cutting means operable to remove said increments and the third control elements located thereon, and third means operated by said scanning means to render said label machine inoperative to apply labels when the combination of third control elements on said two increments in any repeat length is not the proper one for the particular product, and means for transferring the labels severed by said cutting means to a place of application to the containers for the said particular product.

17. In a label machine as defined in claim 16, in which said label web has provided thereon a fourth control element in each repeat length thereof and said scanning means is constructed and arranged to scan the web for such fourth control elements, and means operated each time a fourth control element is read by said scanning means to render said scanning means operative to read simultaneously the third control elements located on the two increments in such repeat length of labels.

18. In a labeling machine, feed means for feeding through the machine a continuous length of label web having printed thereon labels for containers of a given product and each label containing optically recognizable printed characters, means constructed and arranged to optically scan the web for such optically recognizable characters and including means capable of detecting such characters and depending upon such detection thereof creating control signals, a selectively operable device for exerting a controlling action on the labels beyond the place where said optical scanning means are located resulting in a sorting of the labels having such printed characters from labels not provided with said printed characters, means controlled by sad control signals for selectively operating said operable device, cutting means for severing labels from the web, and transfer means for transferring labels severed by said cutting means to a place for application of such labels to said containers.

19. In a label machine, feed means for feeding through the machine a continuous length of label web having labels provided thereon so that the distances between certain of the adjacent labels on the web are different from the distances between other adjacent labels on the web, a first label cutting means for applying severing cuts to the web between adjacent labels thereof, a second cutting means for applying severing cuts to the web between adjacent labels thereof and spaced apart from the cuts applied by said first cutting means, and means operable to selectively actuate said first and second cutting means in singular and multiple relation at different intervals in accordance with the spacing relation of adjacent labels on said web.

20. In a label machine, feed means for feeding through the machine a continuous length of label web having labels provided thereon so that the distance between certain of the adjacent labels on the web are different from the distances between other adjacent labels on the web, a first label cutting means for applying severing cuts to the web between adjacent labels thereof, a second cutting means for applying severing cuts to the web between adjacent labels thereof and spaced apart from the cuts applied by said first cutting means, means supporting said first and second cutting means for movement relative to each other and operable to vary the widths of the spaces between the cuts made thereby, and means operable to selectively actuate said first and second cutting means in accordance with the spacing relation of adjacent labels on said web.

21. In a labeling machine, means to feed and apply labels to articles, means for detecting detectable matter associated with each of such labels, a first recording means associated with the detecting means to record the number of times labels are presented thereto, and a second recording means controlled by the detecting means and operable by the latter to record the number of labels failing to have the detectable matter associated therewith.

22. In a labeling machine, means to support a roll of label web, means to feed successively from a roll mounted on said supporting means and along a path through the labeling machine, the individual labels for a given product and on each of which are printed while in the web form localized areas of detectable matter constituted of a material different from the inks employed in printing the body of the labels, a detecting device capable of detecting said matter on each label, means to mount said detecting device at a place along the path followed by said labels through the labeling machine, said detecting device including means automatically operative to detect the presence of said material apart from the ink employed in printing the body of the label, and to create electrical impulses as a result of such detection as said labels having said detectable material thereon arrive at said place where said detecting device is mounted, an operable device for exerting a selective controlling action on the labels beyond the place where said detecting device is mounted resulting in a sorting of the labels having such detectable material thereon from labels not provided with such material in the said localized areas thereof, and means connected to said detecting device and said operable device and utilizing such created electrical impulses to control said operable device.

23. In a label machine, means for feeding through the machine a continuous length of label web having provided thereon given repeat lengths of labels with certain of the adjacent labels on said web being in given spaced relation and other adjacent labels on the web being spaced differently than said certain adjacent labels, a label severing device having a pair of cutters selectively operable to produce single and double cuts in successively removing the terminal labels from the web, and means for selectively operating said severing device to cause it to make single and double cuts dependent on the different spacings of the labels and resulting in the said labels all being of the same size irrespective of the spacing of the labels in the web.

24. In a label machine as defined in claim 23, including means located adjacently to said severing device to remove web material resulting from said severing operation as it is severed from the web.

25. In a label machine as defined in claim 23, including means to control said feeding means, said feed control means and said severing means being positioned along the line of feed of said web substantially at least one repeat length apart.

26. In a label machine, means for feeding through the machine a continuous length of label web having provided thereon a series of labels wherein certain of the adjacent labels thereof are connected by web portions having different widths than the portions of the web connecting other adjacent labels in such series, a selectively operable label severing device capable of severing by single and double cuts the terminal labels from the web, and means for selectively operating said severing device to cause it alternatively during the severing of the terminal labels to make cuts severing the web portions connecting such terminal labels to the web and severing any web portions between adjacent labels from both the web and such labels.

27. In a label machine as defined in claim 26 including means controlled by elements provided on the label web for controlling the operations of said selectively operating means to effect such selective alternative operations of said severing device.

28. In a labeling machine, means for feeding through through the machine a continuous length of label web having certain of the adjacent labels provided thereon spaced differently than other adjacent labels thereon, a label severing device for successively removing the terminal labels from the web, said severing device being selectively operable to make alternatively in the operations thereof single or double cuts in the web to cut the labels uniformly regardless of the spacing relation between adjacent labels, and means responsive to the label positions on the web for selectively operating said severing device to cut the labels uniformly.

29. In a labeling machine as defined in claim 28, in which the labels are provided on the label web in given repeat lengths with each repeat length having certain of the labels in abutting relation and provided with a non-labeled increment of label web of a longitudinal dimension substantially different than such dimension of the labels in such repeat length, said severing device and said selective operating means being constructed and arranged to cause said severing device when actuated to cut to make alternatively single and multiple cuts in the web to cut from the web each of the labels and such increment in each repeat length.

30. In a label machine, feed means for feeding through the machine a continuous length of label web having labels of given lengths provided therein so that the distances between certain of the adjacent labels on such web are different from the distances between other adjacent labels on the web, and having control elements thereon related to such differences in the spacings between the labels on such web, and means including selectively operable severing means controlled by said control elements for making alternatively single and double cuts to make different sized widths of cuts dependent on the different spacings of the labels so that in successive cutting operations thereof the labels are separated in their given lengths from the web irrespective of the different spacings therebetween.

31. In a label machine as defined in claim 30, in which the control elements on the web are of two types, and said label separating means is controlled by such two control types to effect cuts in the web related to the distances between said certain labels and to the distances between said other labels.

32. In a label machine, feed means for feeding through the machine a continuous length of label web having labels of given lengths provided therein so that the distances between certain of the adjacent labels on such web are different from the distances between other adjacent labels on the web, and having control elements thereon related to such differences in the spacings between the labels on such web, and means including selectively operable severing means controlled by said control elements for separating the labels in their given lengths from the web irrespective of the different spacings therebetween, said severing means comprising a first cutting means for applying severing cuts to the web, a second cutting means for applying severing cuts tot he web spaced apart from the cuts applied by said first cutting means, and means operable to actuate selectively said first and second cutting means to make alternatively single and double cuts in the web dependent on the spacings in the web between the labels.

References Cited

UNITED STATES PATENTS

| | | | |
|---|---|---|---|
| 2,704,634 | 3/1955 | Rauch | 250—71 XR |
| 2,742,631 | 4/1956 | Rajchman et al. | 250—71 XR |
| 3,010,864 | 11/1961 | Schneider et al. | 156—64 |
| 3,026,236 | 3/1962 | Hein et al. | 156—355 |
| 3,035,380 | 5/1962 | Leavens | 53—47 |
| 3,162,565 | 12/1964 | Miller et al. | 156—159 |
| 3,169,432 | 2/1965 | Hoffman et al. | 83—371 |
| 3,340,678 | 9/1967 | Rhodes | 156—510 |
| 2,525,741 | 10/1950 | Von Hofe et al. | 156—499 |
| 2,946,281 | 7/1960 | Sohn | 156—384 X |
| 3,140,214 | 7/1964 | Von Hofe | 156—351 |
| 3,212,950 | 10/1965 | Philippi | 156—351 |
| 3,237,973 | 3/1966 | Rumberger | 283—62 |
| 3,291,675 | 12/1966 | Orloff et al. | 156—277 X |

JOHN T. GOOLKASIAN, Primary Examiner

D. J. FRITSCH, Assistant Examiner

U.S. Cl. X.R.

83—209, 214; 156—64, 67, 159, 256, 267, 270, 351, 354, 384, 521

UNITED STATES PATENT OFFICE
CERTIFICATE OF CORRECTION

Patent No. 3,536,550      Dated October 27, 1970

Inventor(s) George W. Von Hofe

It is certified that error appears in the above-identified patent and that said Letters Patent are hereby corrected as shown below:

Column 3, line 7, "elevation" should read --elevational--.

Column 15, line 37, "acid" should read --aid--.

Column 19, line 68, "wherenever" should read --whenever--.

Column 21, line 28, "sad" should read --said--.

SIGNED AND SEALED
JAN 5 1971

(SEAL)
Attest:

Edward M. Fletcher, Jr.
Attesting Officer

WILLIAM E. SCHUYLER, JR.
Commissioner of Patents